United States Patent
Crawford

(10) Patent No.: US 10,821,599 B2
(45) Date of Patent: Nov. 3, 2020

(54) DUAL LINEAR DELTA ASSEMBLIES, LINEAR DELTA SYSTEMS, AND RELATED METHODS

(71) Applicant: Battelle Energy Alliance, LLC, Idaho Falls, ID (US)

(72) Inventor: Anthony L. Crawford, Rigby, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 32 days.

(21) Appl. No.: 16/191,093

(22) Filed: Nov. 14, 2018

(65) Prior Publication Data

US 2020/0147782 A1    May 14, 2020

(51) Int. Cl.
*B25J 9/00* (2006.01)
*F16H 25/20* (2006.01)

(52) U.S. Cl.
CPC .............. *B25J 9/009* (2013.01); *B25J 9/0048* (2013.01); *F16H 25/20* (2013.01)

(58) Field of Classification Search
CPC .......... B25J 9/009; B25J 9/0048; F16H 25/20
See application file for complete search history.

(56) References Cited

U.S. PATENT DOCUMENTS

| | | | |
|---|---|---|---|
| 4,652,204 A | 3/1987 | Arnett | |
| 5,378,282 A | 1/1995 | Pollard | |
| 6,047,610 A * | 4/2000 | Stocco | B25J 17/0266 74/479.01 |
| 6,099,217 A | 8/2000 | Wiegand et al. | |
| 6,497,548 B1 | 12/2002 | Roy et al. | |
| 6,516,681 B1 | 2/2003 | Pierrot et al. | |
| 6,974,297 B2 | 12/2005 | Brogardh | |
| 6,979,932 B2 | 12/2005 | Hamann et al. | |
| 7,124,660 B2 | 10/2006 | Chiang | |
| 7,331,750 B2 * | 2/2008 | Merz | B25J 9/104 414/735 |

(Continued)

FOREIGN PATENT DOCUMENTS

| | | |
|---|---|---|
| CN | 106737600 A | 5/2017 |
| CN | 107009350 A | 8/2017 |

(Continued)

OTHER PUBLICATIONS

Williams II, "The Delta Parallel Robert: Kinematics Solutions", Internet Publication, www.ohio.edu/people/williar4/html/pdf/DeltaKin.pdf, (Jan. 2016) 46 pages.

(Continued)

*Primary Examiner* — David M Fenstermacher
(74) *Attorney, Agent, or Firm* — TraskBritt

(57) ABSTRACT

A dual linear delta assembly includes a frame, a first linear delta system, and a second linear delta system concentric with the first linear delta system. Each of the first linear delta system and the second linear delta system may include rails mounted to the frame, linear actuators, each linear actuator coupled to a respective rail of the rails and configured to translate along a longitudinal length of the respective rail, pairs of parallel rods each operably coupled to a respective linear actuator of the linear actuators, and a platform coupled to a longitudinal end of each of the pairs of parallel rods opposite the respective linear actuator of the linear actuators.

23 Claims, 7 Drawing Sheets

(56) References Cited

U.S. PATENT DOCUMENTS

| | | | |
|---|---|---|---|
| 9,566,708 | B2 | 2/2017 | Kurnianto |
| 10,071,478 | B2 | 9/2018 | Houston et al. |
| 2004/0028516 | A1 | 2/2004 | Brogardh |
| 2004/0037663 | A1 | 2/2004 | Zarske |
| 2004/0052628 | A1 | 3/2004 | Thurneysen et al. |
| 2010/0263471 | A1 | 10/2010 | Weber |
| 2011/0097184 | A1 | 4/2011 | Kinoshita et al. |
| 2011/0120253 | A1* | 5/2011 | Tara ................ B25J 9/042 74/490.02 |
| 2011/0154936 | A1 | 6/2011 | Zhao et al. |
| 2013/0017050 | A1* | 1/2013 | Fukudome ........ B25J 17/0266 414/729 |
| 2014/0083231 | A1* | 3/2014 | Sutherland ........... B25J 5/007 74/490.05 |
| 2014/0150591 | A1 | 6/2014 | Yang |
| 2014/0331806 | A1* | 11/2014 | Nagatsuka ......... B25J 9/0051 74/490.01 |
| 2014/0338489 | A1 | 11/2014 | Peng et al. |
| 2014/0360306 | A1 | 12/2014 | Mihara et al. |
| 2015/0176754 | A1 | 6/2015 | Houston et al. |
| 2015/0343631 | A1 | 12/2015 | Martinez-Esponda |
| 2016/0096329 | A1 | 4/2016 | Ko et al. |
| 2016/0332296 | A1 | 11/2016 | Kurnianto |
| 2017/0050278 | A1 | 2/2017 | Jaster |
| 2017/0144379 | A1 | 5/2017 | Sung et al. |
| 2019/0210220 | A1* | 7/2019 | Wu ................... B25J 17/0266 |
| 2019/0275669 | A1* | 9/2019 | Matsushita ........... B25J 9/1623 |
| 2019/0329429 | A1* | 10/2019 | Yamamoto ........... B25J 9/1623 |

FOREIGN PATENT DOCUMENTS

| | | |
|---|---|---|
| CN | 107486843 A | 12/2017 |
| CN | 108465803 A | 8/2018 |
| EP | 2821186 A3 | 5/2015 |
| JP | 2009-297793 A | 12/2009 |
| JP | 2006-082157 | 8/2012 |
| KR | 10-2014-0122493 A | 10/2014 |
| WO | 2015/115887 A1 | 8/2015 |

OTHER PUBLICATIONS

Stan et al., "Evolutionary Approach to Optimal Design of 3 DOF Translation Exoskeleton and Medical Parallel Robots", 2008 Conference on Human System Interactions, Krakow, Poland (May 2008) pp. 720-725.

Oberhauser, "Design, Construction, Control, and Analysis of Linear Delta Robot", thesis presented to the faculty of the Russ College of Engineering and Technology of Ohio University (Apr. 2016) 136 pages.

International Search Report for International Application No. PCT/US19/61230, dated Feb. 6, 2020, 3 pages.

International Written Opinion for International Application No. PCT/US19/61230, dated Feb. 6, 2020, 6 pages.

International Search Report for Application No. PCT/US19/61222, dated May 7, 2020, 4 pages.

International Written Opinion for Application No. PCT/US19/61222, dated May 7, 2020, 8 pages.

International Search Report for Application No. PCT/US2019/061243, dated Mar. 19, 2020, 3 pages.

* cited by examiner

DUAL LINEAR DELTA ASSEMBLIES, LINEAR DELTA SYSTEMS, AND RELATED METHODS

STATEMENT REGARDING FEDERALLY SPONSORED RESEARCH OR DEVELOPMENT

This invention was made with government support under Contract Number DE-AC07-05-1D14517 awarded by the United States Department of Energy. The government has certain rights in the invention.

CROSS-REFERENCE TO RELATED APPLICATIONS

The subject matter of application is related to the subject matter of U.S. patent application Ser. No. 16/191,047, filed Nov. 14, 2018, titled "LINEAR DELTA SYSTEMS WITH ADDITIONAL DEGREES OF FREEDOM AND RELATED METHODS" by inventor Anthony L. Crawford, and to the subject matter of U.S. patent application Ser. No. 16/191,135, filed Nov. 14, 2018, titled "LINEAR DELTA SYSTEMS, HEXAPOD SYSTEMS, AND RELATED METHODS" by inventor Anthony L. Crawford, the disclosure of each of which is hereby incorporated herein in its entirety by this reference.

TECHNICAL FIELD

This disclosure relates generally to linear delta robots (e.g., systems) and related methods. In particular, this disclosure relates to dual linear delta assemblies.

BACKGROUND

Delta robots (e.g., parallel robots) are utilized in many applications involving human-systems interaction, medical robots, rehabilitation, exoskeletons, radiological environments, nuclear fuel testing, etc. The foregoing applications typically require robust precision and dynamic workspace computation. Delta robots conventionally provide only three degrees of freedom and such limitations hinder the abilities and applications of the delta robots. Furthermore, when additional degrees of freedom are imparted conventionally to the delta robots via additional systems, the systems typically involve placing additional drive units (e.g. motors) and associated electronics and linkages on the load path (e.g., on a platform) of the delta robots. As a result of this additional mass, inertia is increased when components are moved along the load path, the increased inertia hinders the ability of the delta robots in under water and speed applications. For instance, in underwater applications and/or radiological environments, the drive units (e.g., motors) and any electronics associated with the drive unit require protection (e.g. shielding and/or sealing) because the drive units are located on the load path (e.g., exposed to the environment). Furthermore, the added drive units and associated electronics and linkages result in added water shear and drag when moving the platform and other objects. Moreover, a majority of delta robots are not typically capable of rapid translation of any significant distance in any one direction. Again, the foregoing issue severely limits the applications of delta robots. Additionally, delta robots are typically limited in their working space and conventionally are not mobile, by requiring significant framing to support and operate the delta robots.

BRIEF SUMMARY

Some embodiments of the present disclosure include a dual linear delta assembly. The dual linear delta assembly may include a frame, a first linear delta system, and a second linear delta system. The first linear delta system may include first rails mounted to the frame, first linear actuators, each first linear actuator coupled to a respective rail of the first rails and configured to translate along a longitudinal length of the respective rail, first pairs of parallel rods each operably coupled to a respective linear actuator of the first linear actuators, and a first platform coupled to a longitudinal end of each of the first pairs of parallel rods opposite the respective linear actuator of the first linear actuators. The second linear delta system may include second rails mounted to the frame, wherein each rail of the second rails disposed between adjacent rails of the first rails, second linear actuators, each second linear actuator coupled to a respective rail of the second rails and configured to translate along a longitudinal length of the respective rail, second pairs of parallel rods each operably coupled to a respective linear actuator of the second linear actuators; and a second platform coupled to a longitudinal end of each of the second pairs of parallel rods opposite the respective linear actuator of the second linear actuators.

Some embodiments of the present disclosure include a dual linear delta assembly. The dual linear delta assembly may include a frame, a first linear delta system mounted to the frame, and a second linear delta system mounted to the frame and concentric to the first linear system.

Some embodiments of the present disclosure include a method of forming a dual linear delta assembly. The method may include mounting first rails to a frame, mounting second rails to the frame such that each rail of the second rails is disposed between adjacent rails of the first rails, coupling first linear actuators to the first rails, coupling second linear actuators to the second rails, coupling first pairs of parallel rods to each linear actuator of the first linear actuators, coupling second pairs of parallel rods to each linear actuator of the second linear actuators, coupling a first platform to the first pairs of parallel rods; and coupling a second platform to the second pairs of parallel rods.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
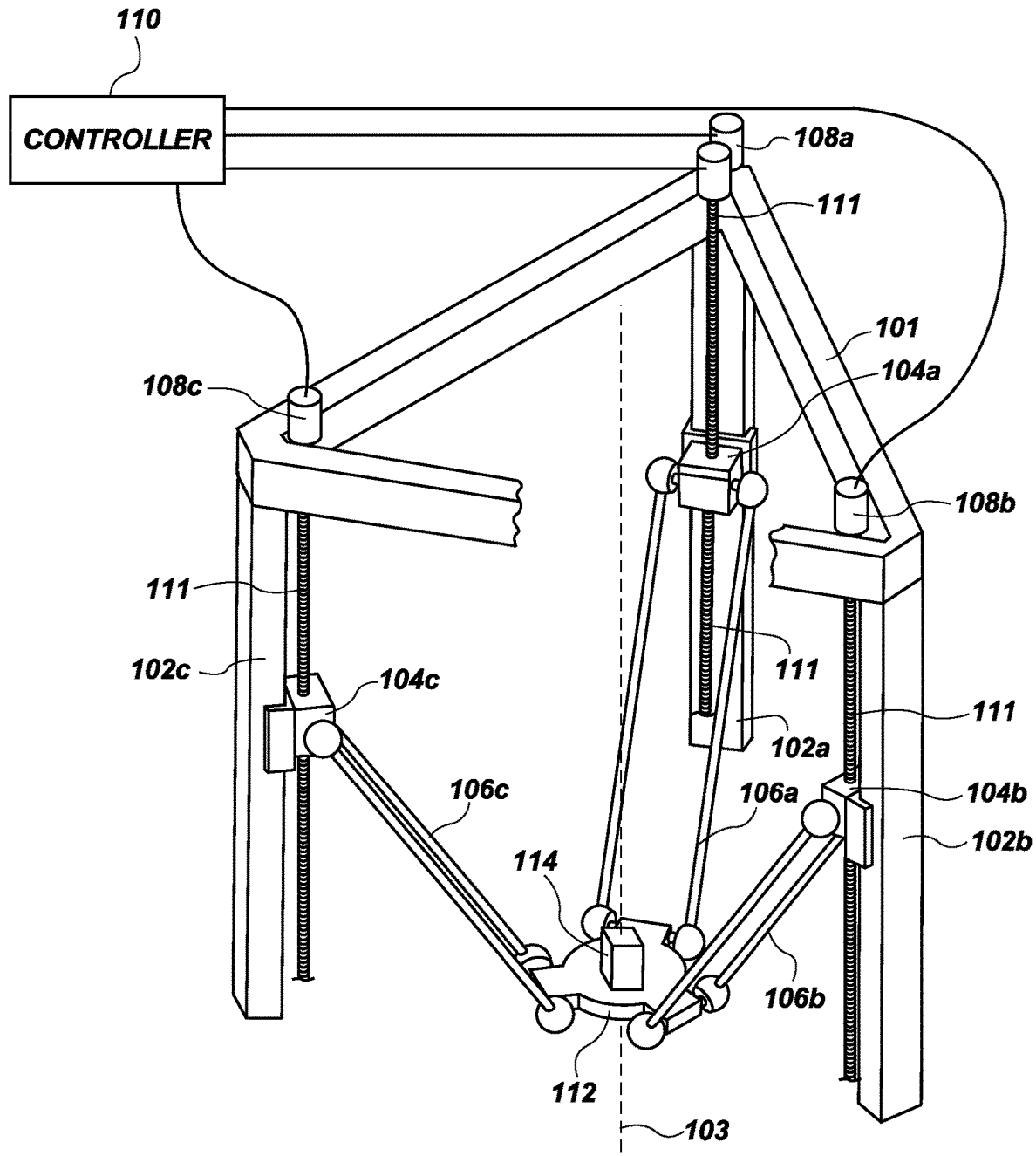
FIG. 1 is a perspective view of a linear delta system according to one or more embodiments of the present disclosure.

The illustrations presented herein are not actual views of any dual linear delta assembly and/or linear delta system or any component thereof, but are merely idealized representations, which are employed to describe the present invention.

As used herein, any relational term, such as "first," "second," "top," "bottom," "upper," "lower," "above," "beneath," "side," etc., is used for clarity and convenience in understanding the disclosure and accompanying drawings, and does not connote or depend on any specific preference or order, except where the context clearly indicates otherwise. For example, these terms may refer to an orientation of elements of a dual linear delta assembly and/or linear delta system when utilized in a conventional manner. Furthermore, these terms may refer to an orientation of elements of a dual linear delta assembly and/or linear delta system when as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

FIG. 1 shows a schematic linear delta system 100 (i.e., a linear delta robot) according to one or more embodiments of the present disclosure. Some portions of the linear delta system 100 are removed to better show the structure of the linear delta system 100. The linear delta system 100 may include a base frame 101, three rails 102a, 102b, 102c, three linear actuators 104a, 104b, 104c (e.g., carriages), three pairs of parallel rods 106a, 106b, 106c, three drive units 108a, 108b, 108c, a controller 110, a platform 112, and an object 114 of interest (e.g., an object to be manipulated).

Each linear actuator (e.g., linear actuator 104a) may be movably coupled to a respective rail (e.g., rail 102a) of the three rails 102a, 102b, 102c (referred to collectively and/or generally with the reference numeral 102) in conventional manners, and the three rails 102 may each face a common center longitudinal axis 103 and may be oriented about 120° apart from each other. Furthermore each linear actuator 104 may be configured to translate along (e.g., back and forth along, up and down along, etc.) a longitudinal length of a respective rail 102. In some embodiments, the movement (e.g., translation) of the linear actuators 104a, 104b, 104c (referred to herein collectively with the reference numeral 104) may be controlled and operated by the three drive units 108a, 108b, 108c (referred to collectively and/or generally with the reference numeral 108) and the controller 110 via conventional manners. For example, in one or more embodiments, the three drive units 108 may each include a motor (e.g., electric motor) operably coupled to the controller 110 and a lead screw 111 to which a respective linear actuator 104 is coupled. The motor may rotate the lead screw 111 which, in turn, causes the linear actuator 104 to translate up or down along the lead screw 111. In further embodiments, each drive unit 108 may include gears and/or pulleys for extending and retracting chains and/or timing belts attached to a respective linear actuator 104. For instance, the drive units 108, rails 102, and linear actuators 104 may include any conventional linear delta robots known in the art.

The three pairs of parallel rods 106a, 106b, 106c (referred to herein collectively and/or generally with the reference numeral 106) may extend between a respective linear actuator 104 and the platform 112. In some embodiments, each rod of each pair of parallel rods 106 may be connected on longitudinal ends thereof to a respective linear actuator 104 and the platform 112 via spherical, universal, and/or magnetic-ball joints. As is known in the art, the rods within the pairs of parallel rods 106 may remain parallel to each other and may define portions of a parallelogram during operation of the linear delta system 100 and movement of the platform 112. Furthermore, as is known in the art, by moving the linear actuators 104 along the three rails 102 (e.g., up and down) in various combinations according to various mathematic algorithms, the platform 112 may be moved within three degrees of freedom. In particular, the linear actuators 104 and platform 112 may be operated via any conventional methods.

In one or more embodiments, the object 114 may be coupled to the platform 112. In one or more embodiments, the object 114 may include an object to be manipulated (e.g., moved and/or placed) via the linear delta system 100. For instance, the object 114 may include a nuclear fuel rod, fiber optic cable, radioactive material, etc. In additional embodiments, the object 114 may include a camera, a probe (e.g., a channel gab probe), a prove depositions system, a scanner (e.g., a flat plate scanner), a sensor for imaging and/or testing procedures, a gripper, a force/torque sensor, a subtractive manufacturing device (e.g. end mill), and/or an additive manufacturing print head.

Figure 2:
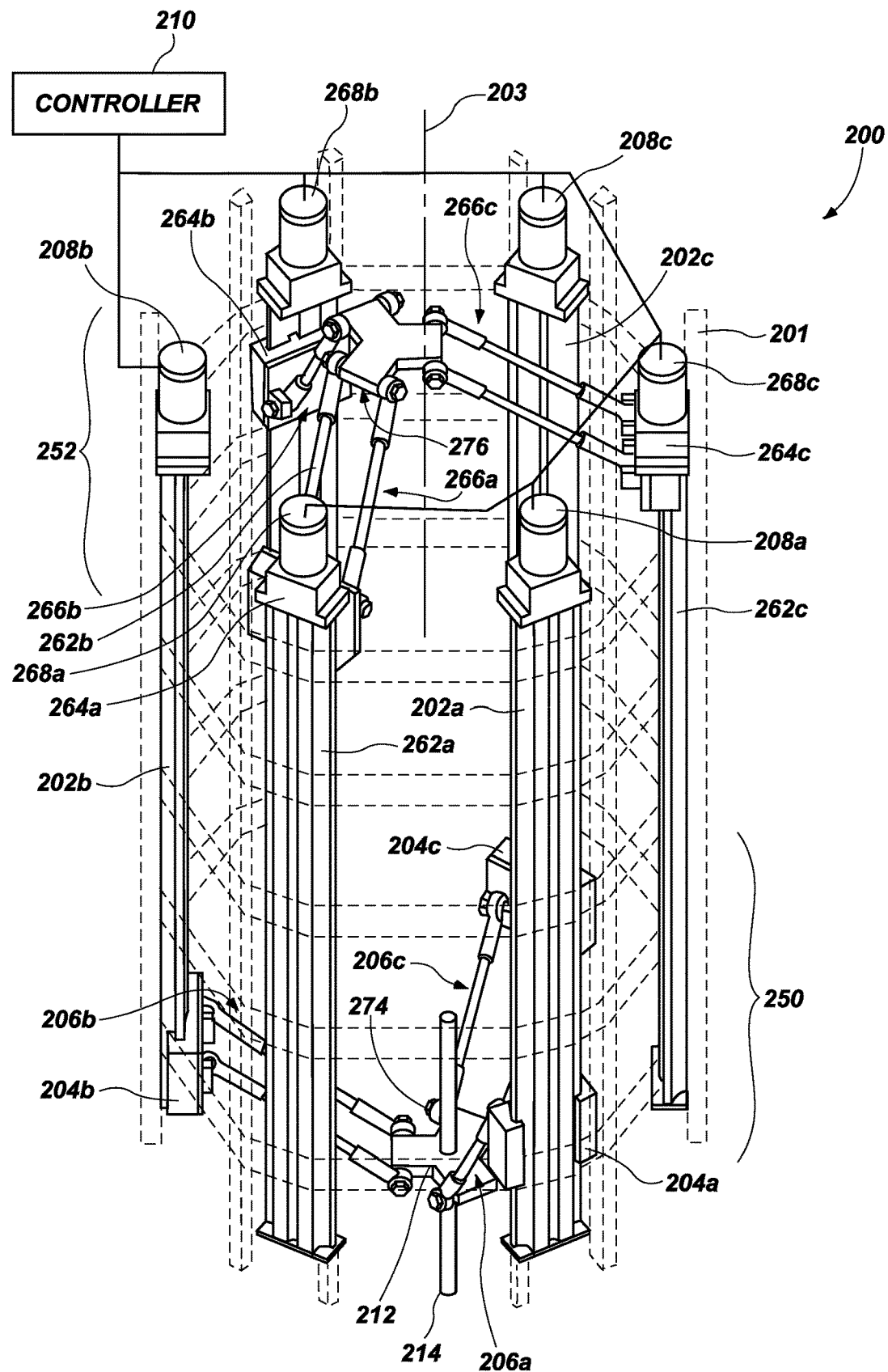
FIG. 2 is a perspective view of a dual linear delta assembly according to one or more embodiments of the present disclosure.
Figure 3A:
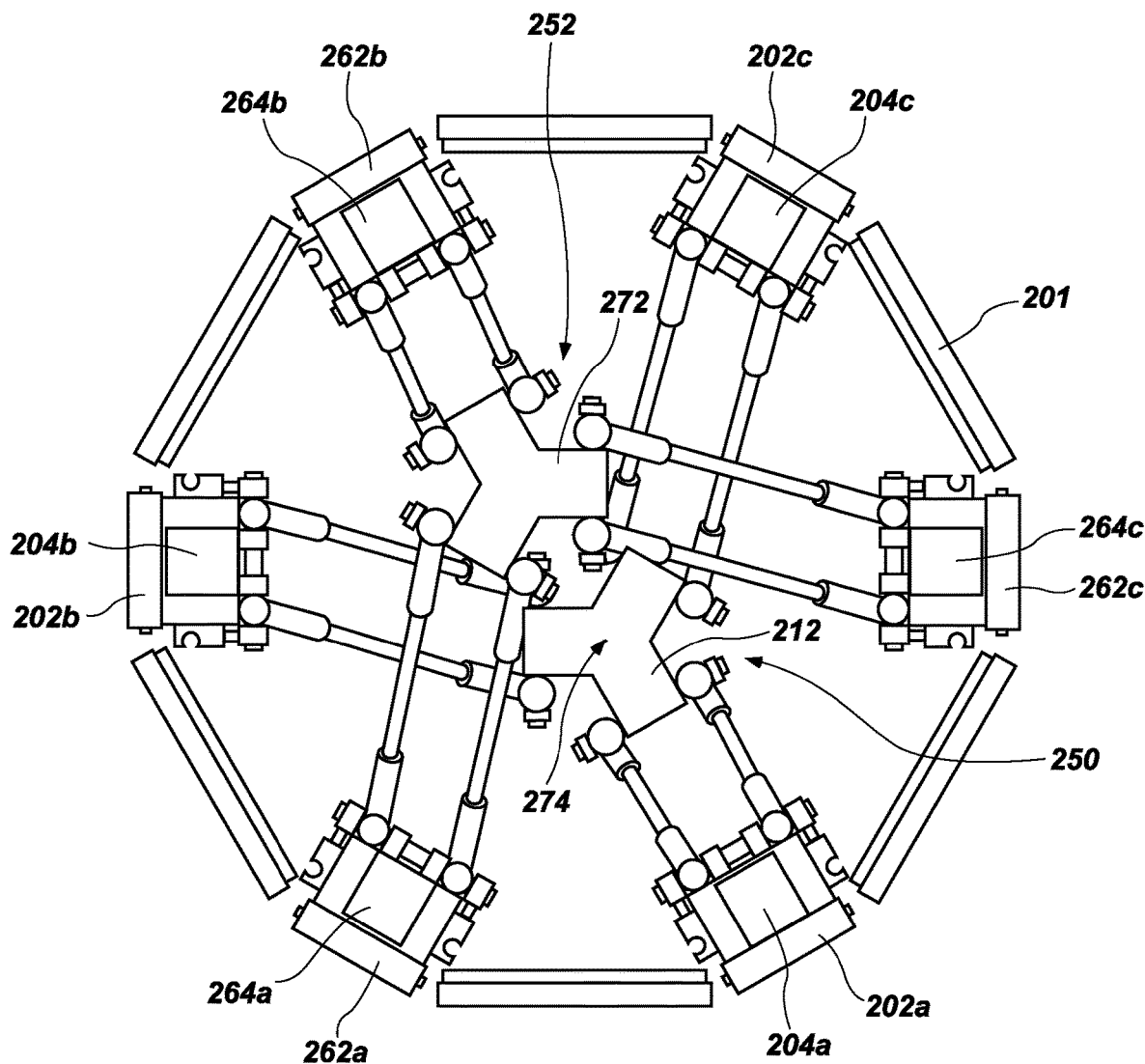
FIG. 3A is top view of the dual linear delta assembly of FIG. 2.

FIG. 2 is a perspective view of a dual linear delta assembly 200 according to one or more embodiments of the present disclosure. FIG. 3A is a top view of the dual linear delta assembly 200 of FIG. 2. Some portions of the dual linear delta assembly 200 are removed in FIG. 3A to better show structure of the dual linear delta assembly 200. Referring to FIGS. 2 and 3A together, the dual linear delta assembly 200 may include a frame 201, a controller 210, a first linear delta system 250, and a second linear delta system 252. In some embodiments, the first linear delta system 250 may be concentric with the second linear delta system 252. For example, the first linear delta system 250 may share a common center longitudinal axis 203 with the second linear delta system 252.

The first linear delta system 250 may include three first rails 202a, 202b, 202c, three first linear actuators 204a, 204b, 204c (e.g., carriages), three first pairs of parallel rods 206a, 206b, 206c, three drive units 208a, 208b, 208c, and a first platform 212. Each linear actuator of the first linear actuators 204a, 204b, 204c (referred to collectively and/or generally with the reference numeral 204) may be movably coupled to a respective rail of the three first rails 202a, 202b, 202c (referred to collectively and/or generally with the reference numeral 202) in conventional manners, and the three first rails 202 may each face the common center longitudinal axis 203 of the dual linear delta assembly 200 and may be oriented, angularly, about 120° apart from each other about the center longitudinal axis 203 of the dual linear delta assembly 200. Furthermore, each first linear actuator 204 may be operated via any of the manners described above in regard to FIG. 1, and the first linear delta system 250 may be assembled via any of the manners described above in regard to the linear delta system 100 of FIG. 1.

The second linear delta system 252 may include three second rails 262a, 262b, 262c, three second linear actuators 264a, 264b, 264c (e.g., carriages), three second pairs of parallel rods 266a, 266b, 266c, three second drive units 268a, 268b, 268c, and a second platform 272. Each linear actuator of the second linear actuators 264a, 264b, 264c (referred to collectively and/or generally with the reference numeral 264) may be movably coupled to a respective rail of the three second rails 262a, 262b, 262c (referred to collectively and/or generally with the reference numeral 262) in conventional manners, and the three second rails 262 may each face the common center longitudinal axis 203 of the dual linear delta assembly 200 and may be oriented, angularly, about 120° apart from each other about the center longitudinal axis 203 of the dual linear delta assembly 200. Furthermore, each second linear actuator 264 may be operated via any of the manners described above in regard to FIG. 1. Moreover, due to respective rails and linear actuators, the dual linear delta assembly 200 may move the first and second linear delta systems 250, 252 relative to one another and relative to the frame 201.

In some embodiments, each of the second rails 262 may be oriented in-between adjacent first rails 202. Furthermore, a given second rail 262 may be angularly separated from an adjacent first rail 202 by about 60° about the center longitudinal axis 203 of the dual linear delta assembly 200. In one or more embodiments, the first rails 202 and the second rails 262 in combination may form a general circle-shape.

In some embodiments, the second linear delta system 252 may be oriented in an inverted orientation relative to the first linear delta system 250. For instance, each of the first platform 212 and the second platform 272 may have respective working surfaces 274, 276. In some embodiments, the working surfaces 274, 276 of the first and second platforms 212, 272 may include a surface of the first and second platforms 212, 272 facing in a direction in which the pairs of parallel rods 206, 266 of the respective platform at least partially extend. For instance, the working surface 274 of the first linear delta system 250 is an upper surface of the first platform 212 as depicted in FIG. 2, and the working surface 276 (e.g., second working surface) of the second linear delta system 252 is a lower surface of the second platform 272 as depicted in. FIG. 2. As a result, the working surface 274 (e.g., first working surface) of the first platform 212 may generally face in a direction opposite to a direction in which the working surface 276 of the second platform 272 generally faces. In some embodiments, the working surface 274 of the first linear delta system 250 may face the working surface 276 of the second linear delta system 252.

In one or more embodiments, the second linear delta system 252 may be disposed above the first linear delta system 250 in an axial direction along the center longitudinal axis 203 of the dual linear delta assembly 200. For example, in some embodiments, the second linear actuators 264 and the second pairs of parallel rods 266 may be disposed above the first linear actuators 204 and the first pairs of parallel rods 206 in the axial direction along the center longitudinal axis 203 of the dual linear delta assembly 200. However, in some instances, when the second platform 272 is relatively close to the first platform 212, the second linear actuators 264 and the second pairs of parallel rods 266 may be disposed below the first linear actuators 204 and the first pairs of parallel rods 206 in the axial direction along the center longitudinal axis 203 of the dual linear delta assembly 200.

In some embodiments, the dual linear delta assembly 200 may further include an object 214 coupled to one or more of the first platform 212 and the second platform 272. For instance, in one or more embodiments, the dual linear delta assembly 200 may further include an object 214 coupled to both the first platform 212 and the second platform 272. In particular, the object 214 may be coupled to the first platform 212 and to the second platform 272. In one or more embodiments, the object 214 may be operably coupled to one or more of the first platform 212 and the second platform 272. For instance, in some embodiments, the object 214 may be attached to and fixed relative to the first platform 212, and the second platform 272 may be coupled to the object 214 to operate the object 214 (e.g., operate a probe deposition system). In some embodiments, one or more of the first platform 212 and the second platform 272 may include additional structure for manipulating the object 214. In view of the foregoing, the object 214 may be manipulated (e.g., moved, operated) by both of the first linear delta system 250 and the second linear delta system 252. Furthermore, the object 214 may be moved relative to one or more of the first linear delta system 250 and the second linear delta system 252.

In view of the foregoing, because one of the first linear delta system 250 and the second linear delta system 252 can move the object 214 relative to the other of the first linear delta system 250 and the second linear delta system 252, the dual linear delta assembly 200 may impart additional degrees of freedom (i.e., degrees of freedom beyond the degrees of freedom imparted by a single linear delta system) to the object 214 (i.e., create directions in which independent motion can be achieved by the object 214). For instance, referring to FIG. 3B, in some embodiments, the first platform 212 may include a passive rotary joint 282 having an offset-axis-passive-universal joint 284 secured thereto. Furthermore, the second platform 272 may include a passive sphere joint 286. The object 214 may be coupled to the universal joint 284, which in combination with the passive rotary joint 282 may impart three additional degrees of freedom to the object 214 (e.g., probe), and the object 214 may be coupled to the passive sphere joint 286 of the second platform 272, which may impart three additional degrees of freedom to the object 214. In view of the foregoing, the dual linear delta assembly 200 may enable the object 214 to rotate about an axis or to translate along an axis beyond what is typically enabled by a single linear delta system. In some embodiments, the dual linear delta assembly 200 may impart three or more additional degrees of freedom to the object 214 beyond that imparted by a single linear delta system. In some embodiments, the additional degrees of freedom may include rotation about and/or translation along two perpendicular horizontal axes (e.g., an X-axis and a Y-axis) and a vertical axis (e.g., a Z-axis).

Furthermore, in view of the foregoing, because the dual linear delta assembly 200 can manipulate the object 214 via both of the first linear delta system 250 and the second linear delta system 252, the dual linear delta assembly 200 may be advantageous over single linear delta systems. For instance, as discussed above, the dual linear delta assembly 200 can move an object relative to the frame 201 of the dual linear delta assembly 200 as well as relative to both of the first linear delta system 250 and the second linear delta system 252. Moreover, because the dual linear delta assembly 200 can move an object relative to the frame 201 of the dual linear delta assembly 200 as well as relative to both of the first linear delta system 250 and the second linear delta system 252, the dual linear delta assembly 200 may increase a relative workspace of the dual linear delta assembly 200, may increase a speed in which the object 214 can be manipulated, and may reduce influence of outside factors in comparison to a single linear delta system.

As noted above, the dual linear delta assembly 200 may increase a relative workspace of the dual linear delta assembly 200 in comparison to a single linear delta system (e.g., the first linear delta system 250). For example, the dual linear delta assembly 200 may increase a relative workspace of the dual linear delta assembly 200 in comparison to a single linear delta system by at least four times. As a non-limiting example, a given object may be coupled to both the first platform 212 on a first longitudinal end of the given object and the second platform 272 on a second longitudinal end of the given object. As a result, the dual linear delta assembly 200 can move the first longitudinal end of the given object in a first direction and can move the second longitudinal end of the given object in a second opposite direction. In comparison, a single linear delta system would only be able to move one longitudinal end of the given object. As a result, relative to the second longitudinal end of the object 214, the dual linear delta assembly 200 can move the first longitudinal end of the object two times the distance that a single linear system would be able to move the first longitudinal end relative to the second longitudinal end of the object.

Conventionally, a workspace of a linear delta system is defined by a volume of a cylinder (i.e., $V=\pi r^2 h$) and is at least partially constrained by the radius (r) of the cylinder. Accordingly, because the dual linear delta assembly 200 can move the object relative to both the first platform 212 and the second platform 272, the dual linear delta assembly 200 can move the first longitudinal end of the object relative to the second longitudinal end twice the distance (e.g., twice the radius (r)) and thus, increases a relative workspace (i.e., the volume of the cylinder) by at least four times (due to the $r^2$) in comparison to a single linear delta system. In view of the foregoing, the dual linear delta assembly 200 may improve procedures for generating a strain within a specimen (e.g., generating strain within a pin transgressing through a tube furnace having a relatively small diameter). For instance, instead of merely applying tension to the pin (as is usually performed in conventional methods and requires a relatively large amount of force to generate strain), the dual linear delta assembly 200 may deflect longitudinal ends of the pin in opposite directions to fully optimize available geometry and more easily generate strain within the pin (i.e., specimen).

As mentioned above, the dual linear delta assembly 200 may increase a speed at which a portion of the object can be moved relative to another portion of the object by a factor of two. As a non-limiting example, a given object can be coupled to both the first platform 212 on a first longitudinal end of the given object and the second platform 272 on a second longitudinal end of the given object. As a result, the dual linear delta assembly 200 can move the first longitudinal end of the given object in a first direction and can move the second longitudinal end of the given object in a second opposite direction. In comparison, a single linear delta system would be able to move one longitudinal end of the given object and, at best, keep the second longitudinal end of the object stationary relative to the first longitudinal end of the object. As a result, the dual linear delta assembly 200 can move the first longitudinal end of the object relative to the second longitudinal end of the object 214 twice as fast a single linear delta system. For instance, the velocity (i.e., speed) $Vx_{rel}$ of the first platform 212 in a first direction (e.g., direction x) relative to the second platform 272 may be represented by the following equation:

$$V_{x212} - V_{x272} = V_{xrel} \quad (1)$$

where $V_{x212}$ represented the velocity of the first platform 212 in direction x and $V_{x272}$ represents the velocity of the second platform 272 in direction x.

Additionally, in some embodiments, the dual linear delta assembly 200 may reduce external effects on the object (e.g., drag and/or kinetic energy) by a factor of four. As a non-limiting example, and as is known in the art, a force exhibited by drag (i.e., the drag force) on an object moving through a fluid (e.g., water, air, etc.) can be represented by the following equation:

$$F_{drag} = \frac{1}{2} \rho V^2 C_D A \quad (2)$$

where $\rho$ represents a density of the fluid, V is the velocity of the object, and $C_D$ is a drag coefficient, and A is a reference area.

Furthermore, the drag force $F_{drag\_single}$ experienced by an object being moved by the single platform of a single delta robot at, for example, 2 meters/second may be represented by the following equation:

$$F_{drag\_single} = \frac{1}{2} \rho \left(2 \frac{m}{s}\right)^2 C_D A = \frac{1}{2} \rho \left(4 \frac{m^2}{s^2}\right) C_D A \quad (3)$$

Conversely, the drag force $F_{drag\_double}$ experienced by the upper and lower portions of the object being moved by two platforms (e.g., the first and second platforms 212, 272) of a dual linear delta assembly 200 at a relative speed of 2 meters/second may be represented by the following equation:

$$F_{drag\_double} = \frac{1}{2} \rho \left(1 \frac{m}{s}\right)^2 C_D A = \frac{1}{2} \rho \left(-1 \frac{m}{s}\right)^2 C_D A = \frac{1}{2} \rho \left(1 \frac{m^2}{s^2}\right) C_D A \quad (4)$$

In view of the foregoing, the dual linear delta assembly 200 may reduce drag experienced by the object and the corresponding first and second platforms 212, 272 by a factor of four.

As another non-limiting example, as is known in the art, a kinetic energy of the object may be represented by the following equation:

$$E = \frac{1}{2} m * V^2 \quad (5)$$

where m represents mass and V represents a velocity of the object. When moved by a single linear delta assembly 200 at 2 meters/second, the kinetic energy of the object may be represented by the following equation:

$$E_{single} = \frac{1}{2} m \left(2 \frac{m}{s}\right)^2 = \frac{1}{2} m \left(4 \frac{m^2}{s^2}\right) \quad (6)$$

Conversely, the kinetic energy of the object, when moved by a dual linear delta assembly 200 at a relative 2 meters/second may be represented by the following equation:

$$E_{double} = \frac{1}{2} m \left(1 \frac{m}{s}\right)^2 = \frac{1}{2} m \left(-1 \frac{m}{s}\right)^2 = \frac{1}{2} m \left(1 \frac{m^2}{s^2}\right) \quad (7)$$

In view of the foregoing, the dual linear delta assembly 200 may reduce kinetic energy experienced by the object by a factor of four.

Moreover, the dual linear delta assembly 200 may increase an amount of force that can be applied to an object by at least two times in comparison to a single linear delta system when used together relative to base. In view of the foregoing, the dual linear delta assembly 200 may be able to provide a given force to an object while reducing a required amount of space of the dual linear delta assembly 200 (e.g., a footprint of the dual linear delta assembly 200) in comparison to a conventional linear delta system that is capable of applying the same force and speed. As a result, in some instances, the dual linear delta assembly 200 may be able to perform the same functions as a single linear delta system while being smaller in size than the single linear delta system. Accordingly, the dual linear delta assembly 200 may be more versatile and may provide cost savings in comparison to single linear delta systems with the same overall force, speed, and workspace capabilities.

Figure 3B:
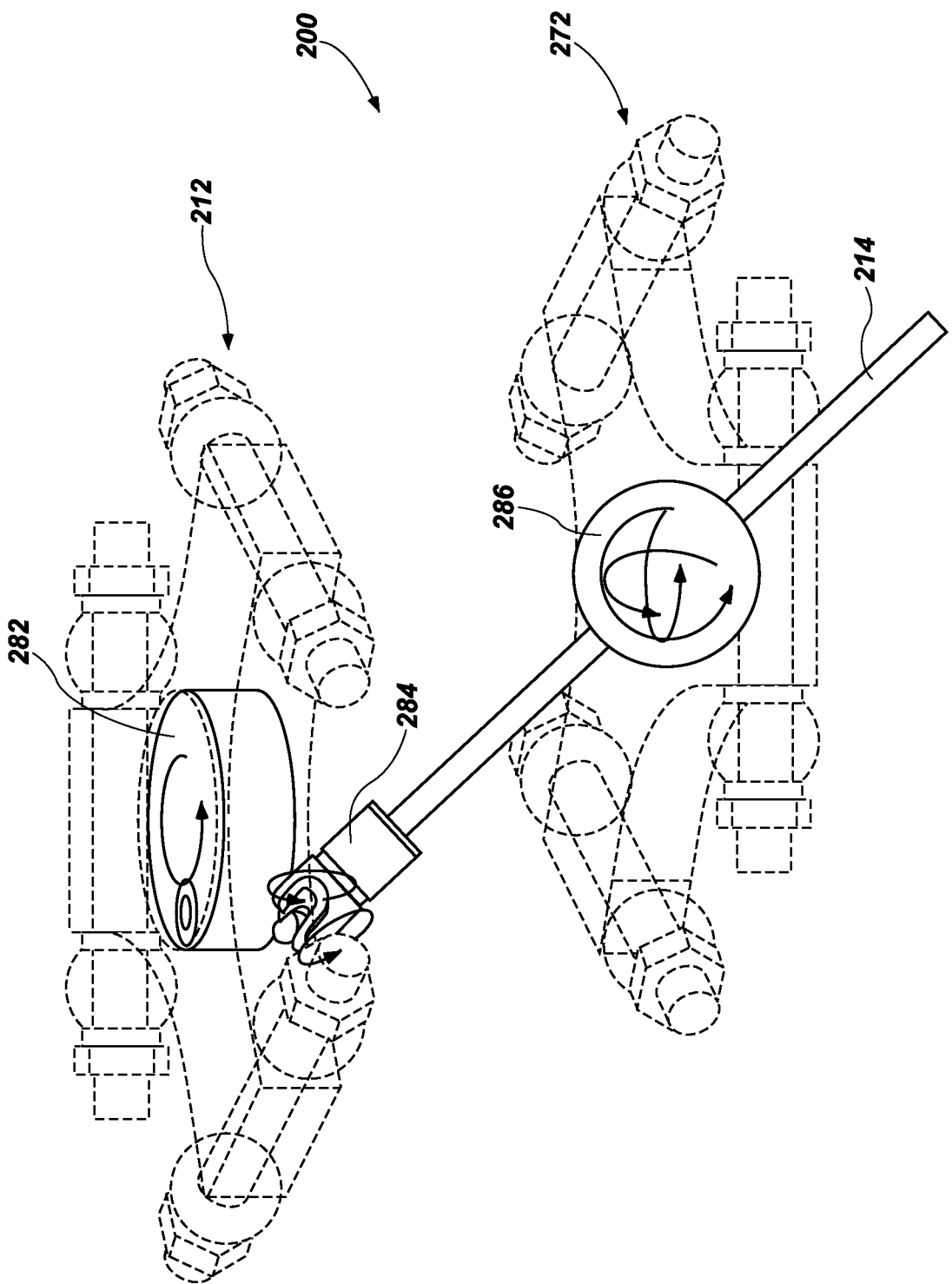
FIG. 3B is a perspective view of a dual linear delta assembly according to one or more embodiments of the present disclosure.

Referring still to FIGS. 2-3B together, the dual linear delta assembly 200 may provide additional advantages over conventional linear delta systems. For example, because the dual linear delta assembly 200 adds three degrees of freedom to an object 214 (e.g., a probe) shared by both platforms in comparison to conventional linear delta systems, when probing or scanning another object (e.g., a fuel assembly), the dual linear delta assembly 200 may be able to more accurately probe and/or scan the another object utilizing the three additional degrees of freedom even when the other object has a complex (e.g., contorted) shape.

Furthermore, even in comparison to conventional linear delta systems that include electronics/motors on a platform that add degrees of freedom at the platform, the dual linear delta assembly 200 of the present disclosure utilizes drive units (e.g., electric motors) that are disposed at the frame 201 proximate a top of the dual linear delta assembly 200 (i.e., distal to the first platform). As a result, the first and second drive units 208, 268 of the dual linear delta assembly 200 are protected and separated from any environment hazards experienced by the first or second platforms 212, 272 and the object 214. For instance, in nuclear applications (e.g., manipulating radioactive materials, testing radioactive materials, performing tests underwater, etc.) presenting harsh environments, the dual linear delta assembly 200 protect the crucial electronics (e.g., drive units) needed to operate the dual linear delta assembly 200 from the harsh environments without requiring excessive shielding or protection (e.g. sealing and/or tethering) disposed on the first and/or second platforms 212, 272. As a result, the first platform 212, the second platform 272, and the dual linear delta assembly 200 may be lighter in comparison to shielded linear delta systems, which enables faster and more accurate movement of the dual linear delta assembly 200. Moreover, by avoiding additional shielding and/or protection, which often interfere with working space, the dual linear delta assembly 200 described herein avoids interfering with a working space. Furthermore, even if the first and/or second drive units 208, 268 of the dual linear delta assembly 200 require shielding for a particular application, the shielding (i.e., the weight of the shielding) is not added to the first or second platforms 212, 272, the first and second linear actuators 204, 264, and/or first and second pairs of parallel rods 206, 266. Rather, the shielding is added at the first and/or second drive units 208, 268 which are secured to the frame 201 at a top of the dual linear delta assembly 200. Thus, the dual linear delta assembly 200 does not add to the mass of the first platform 212 or second platform 272 or inertia during movement along the load path of the dual linear delta assembly 200. Again, by not adding mass to the first or second platforms 212, 272 or increasing inertia during movement along the load path, the dual linear delta assembly 200 provides improved speed and accuracy in comparison to a conventional single linear delta system. As a result of the foregoing, the dual linear delta assembly 200 may provide relatively fast and accurate movements with fewer drive units in comparison to conventional shielded systems. Accordingly, the dual linear delta assembly 200 may provide cost savings.

Moreover, the dual linear delta assembly 200 is advantageous because the object's 214 displacement is not constrained by any physical tethering cord or telescoping shaft, which are typically necessary to impart additional degrees of freedom to an object within a conventional single linear delta system. Furthermore, in underwater applications, the dual linear delta assembly 200 may experience less water shear, drag, and turbulence in comparison to conventional linear delta systems when operating a sensor. Moreover, as is known in the art, water shear, drag, and turbulence can effect sensor data at relatively high speeds. As a result, the dual linear delta assembly 200 may provide more accurate sensor data in a faster manner in comparison to conventional linear delta systems.

In some embodiments, the dual linear delta assembly 200 may be utilized to facilitate deposition of a probe within a granular mediums via vibration or other vibration applications. As a non-limiting example, during operation, the controller 110 (FIG. 1) may be configured to move the first linear actuators 204 and first platform 212, which may operate a probe deposition system, in an overall triangle wave motion, sinusoidal wave motion, or some other oscillatory wave motion along one axis (e.g., Z-axis) and to move the second linear actuators 264 and second platform 272, which may support the probe deposition system (e.g., object 214), in a counter (e.g., opposite) triangle wave motion, a counter sinusoidal wave motion, or some other oscillatory wave motion along the same axis. The foregoing results in a zero net global motion of the probe deposition system and enables the linear actuators 204, 264 to distribute vibration loads along longitudinal lengths of the linear delta system's lead screws. Simultaneously, the controller 110 (FIG. 1) may be configured to add smaller-amplitude-higher-frequency triangle wave motion, sinusoidal wave motion, or some other oscillatory wave motion in comparison to the above-described motions (i.e., waveforms) to both the first linear actuators 204 and first platform 212 and the second linear actuators 264 and second platform 272 or the entire dual linear delta assembly 200.

Figure 4A:
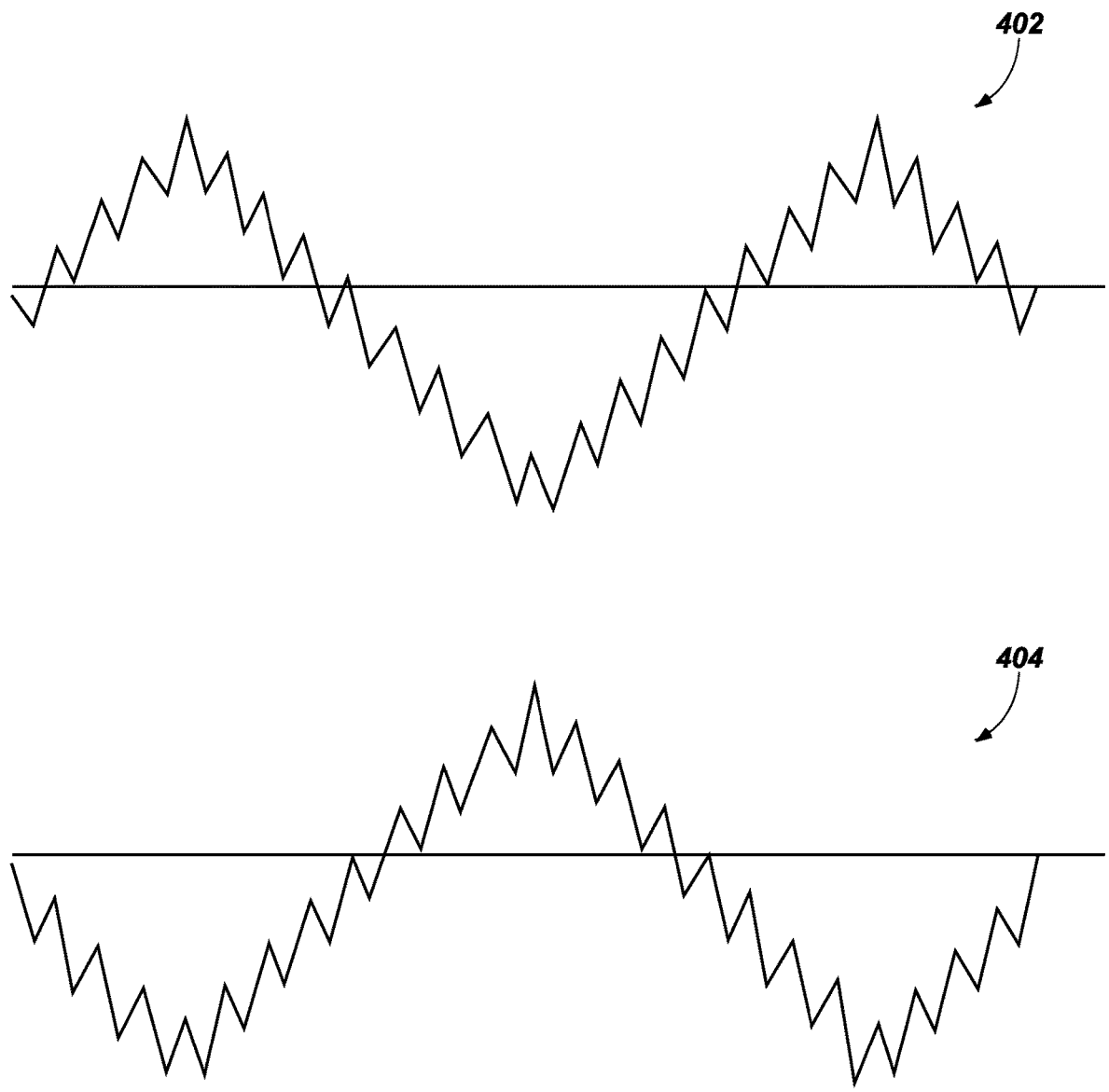
FIG. 4A is a schematic representation of motion waves experienced by portions of a dual linear delta assembly according to one or more embodiments of the present disclosure.
Figure 4B:
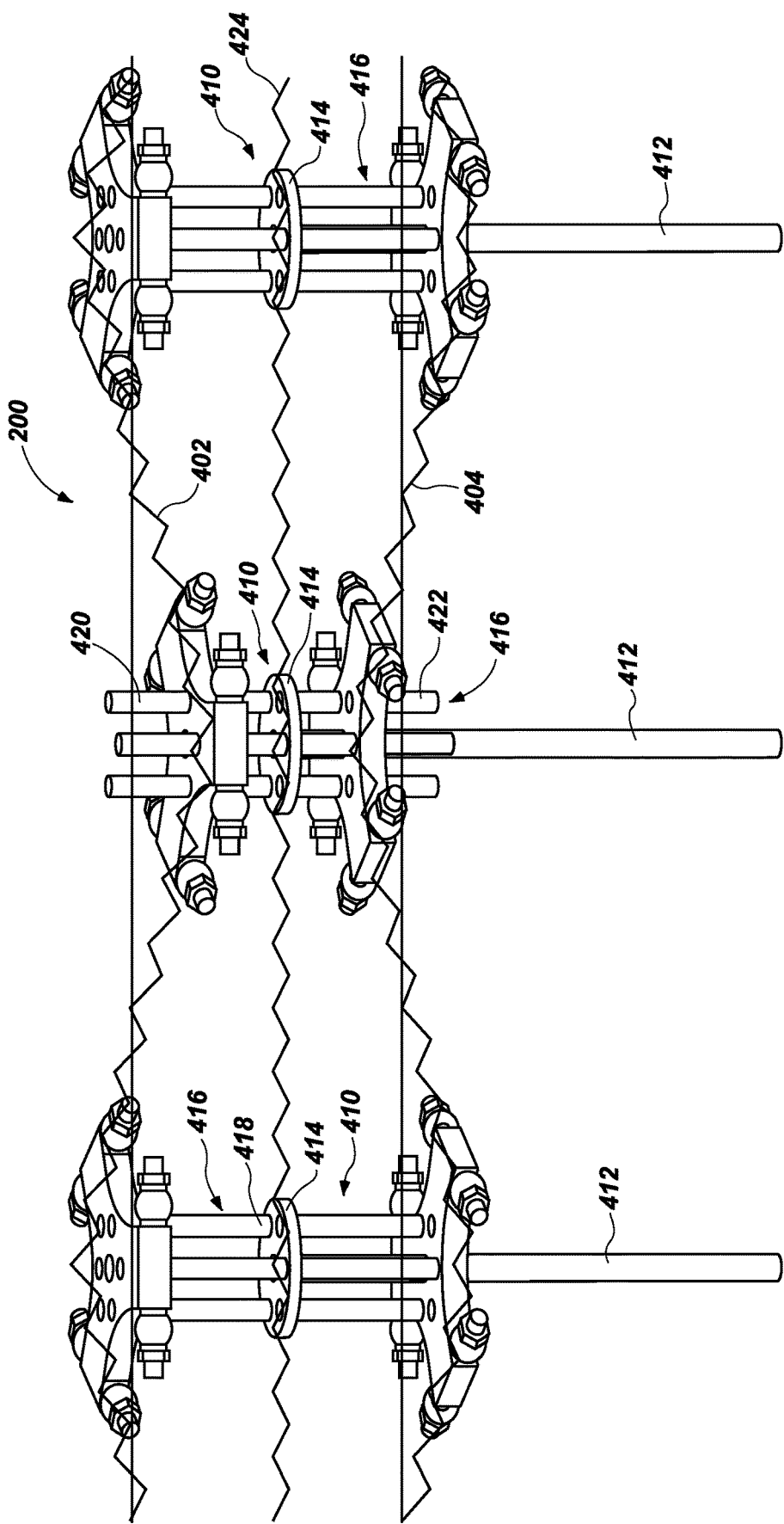
FIG. 4B is a schematic representation a dual linear delta assembly overlaying the motion waves of FIG. 4A according to one or more embodiments of the present disclosure.

FIG. 4A shows a schematic representation of a waveform 402 that may be experienced by the first linear actuators 204 and first platform 212 and a waveform 404 that may be experienced by the second linear actuators 264 and second platform 272. FIG. 4B shows a shows a schematic representation of the dual linear delta assembly 200 overlaying the waveforms 402 and 404. Referring to FIGS. 2-4B together, the resulting motion of the probe deposition system (e.g., object 214) relative to a granular medium or environment merely equates to the combination of the smaller-amplitude-higher-frequency waveforms. Referring to FIG. 4B, in some embodiments, a probe deposition system 410 of the dual linear delta assembly 200 may include a probe 412, a probe plate 414, and a plurality of rods assemblies 416. Each rod assembly 416 may include a center portion 418, an upper threaded portion 420, and a lower threaded portion 422. The upper and lower threaded portions 420, 422 may be rotatable relative to the center portion 418. For instance, the upper and lower threaded portions 420, 422 may be rotatably coupled to the center portion 418. In other embodiments, the upper and lower threaded portions 420, 422 may be fixed relative to the center portion 418. Furthermore, in one or more embodiments, the upper threaded portion 420 may be threaded in an opposite direction to which the lower threaded portion 422 is threaded. In some embodiments, each of the upper and lower threaded portions 420, 422 may be threaded with a relatively steep pitch. The upper threaded portions 420 of the plurality of rods assemblies 416 may be threaded through the first platform 212, and the lower threaded portions 422 of the plurality of rods assemblies 416 may be threaded through the second platform 272. The probe plate 414 may be secured to the center portions 418 of the plurality of rods assemblies 416. In some embodiments, the probe plate 414 may be secured to the center portions 418 of the plurality of rods assemblies 416 such that the center portions 418 of the plurality of rods assemblies 416 can rotate relative to the probe plate 414. The probe 412 may be secured to the probe plate 414.

In operation, as the first and second platforms 212, 272 move up and down and relative to one another in the overall triangle wave motions, the sinusoidal wave motions, or the other oscillatory wave motions described above, the upper and lower threaded portions 420, 422 of the plurality of rods assemblies 416 may rotate relative to the first and second platforms 212, 272 such that the first and second platforms 212, 272 can translate along the upper and lower threaded portions 420, 422 of the plurality of rods assemblies 416. Respectively. In some embodiments, the upper and lower threaded portions 420, 422 of the plurality of rods assemblies 416 may also rotate relative to the center portions 418 of the plurality of rods assemblies 416. In view of the foregoing, when the first and second platforms 212, 272 move up and down and relative to one another, the probe plate 414 may remain at least substantially centered between the first and second platforms 212, 272 and may experience only the smaller-amplitude-higher-frequency waveforms 424 described above and depicted in FIG. 4B.

Referring to FIGS. 2-4B together, having the first linear actuators 204 and first platform 212 and the second linear actuators 264 and second platform 272 experience opposite wave motions relative to each other enables the dual linear delta assembly 200 to distribute vibration loads across a longitudinal length (e.g., several threads) of the lead screws (e.g., lead screws 111) of the first and second drive units 208, 268 instead of a single longitudinal location of the lead screws. This may reduce wear of the lead screws and may reduce pitting at ball to screw interfaces (e.g., an interface between the first and second linear actuators 204, 264 and the lead screws). By reducing wear, the dual linear delta assembly 200 may be capable of experiencing higher vibration loads or generating more complex vibration patterns (e.g., three-dimensional vibrations) in comparison to conventional single linear delta systems and may be utilized in wide variety of granular mediums and vibration applications in comparison to conventional single linear delta systems. Furthermore, by reducing wear, the dual linear delta assembly 200 may experience longer life cycles in comparison to conventional single linear delta systems and may lead to cost savings.

Furthermore, by distributing vibration loads across a longitudinal length of the lead screws, the dual linear delta assembly 200 of the present disclosure may provide a rapid prototyping system with deposition materials that demonstrate beneficial responses (e.g., better adhesion, relatively easier extrusion, etc.) when subject to vibration. Moreover, the dual linear delta assembly 200 may provide advantages in general vibration testing of components under simple or complex operational vibration loads or seismic loads. Likewise, the dual linear delta assembly 200 may be in advantages in operations that include precisely embedding fiber, string, or corded materials in granular mediums.

Figure 5:
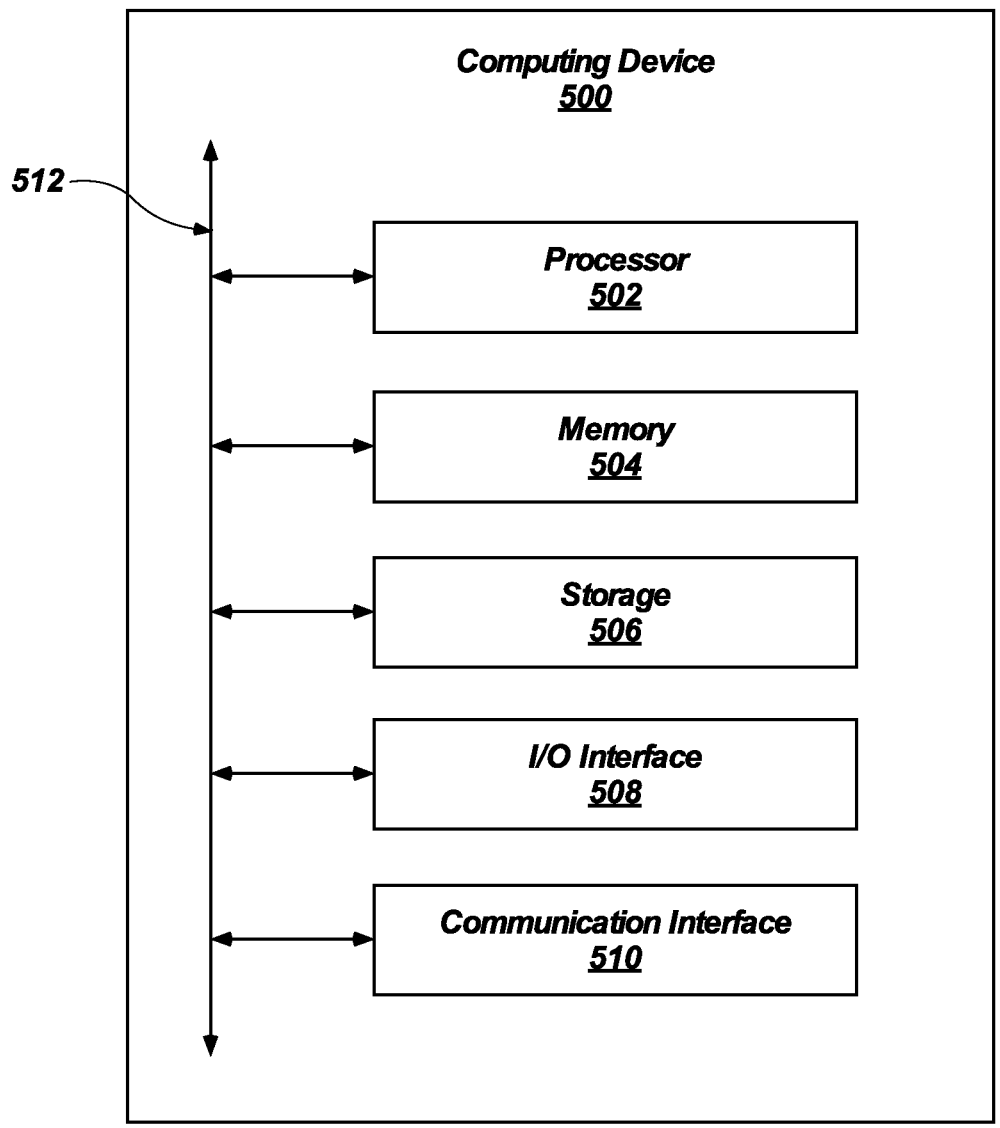
FIG. 5 is schematic diagram of a controller of a linear delta system according to one or more embodiments of the present disclosure.

FIG. 5 is a block diagram of a controller 110 according to one or more embodiments of the present disclosure. As shown in FIG. 5, in some embodiments, the controller 110 may include the linear delta operating system 500. One will appreciate that one or more computing devices may implement the linear delta operating system 500. The linear delta operating system 500 can comprise a processor 502, a memory 504, a storage device 506, an I/O interface 508, and a communication interface 510, which may be communicatively coupled by way of a communication infrastructure. While an exemplary computing device is shown in FIG. 5, the components illustrated in FIG. 5 are not intended to be limiting. Additional or alternative components may be used in other embodiments. Furthermore, in certain embodiments, the linear delta operating system 500 can include a fewer or greater number of components than those shown in FIG. 5. Components of the linear delta operating system 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers ("TLBs"). Instructions in the instruction caches may be copies of instructions in the memory 504 or the storage device 506. In one or more embodiments, the processor 502 and/or memory 504 may include stored thereon one or more algorithms for operating the first and second linear delta systems 250, 252 of the dual linear delta assembly 200 in conjunction with each other. For instance, the algorithms may include control algorithms for the first linear delta system 250 and control algorithms having opposite global directions for the second linear delta system 252.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive ("HDD"), a floppy disk drive, flash memory, an optical disc, a magneto-optical disc, magnetic tape, or a Universal Serial Bus ("USB") drive or a combination of two or more of these. The storage device 506 may include removable or non-removable (or fixed) media, where appropriate. The storage device 506 may be internal or external to the linear delta operating system 500. In one or more embodiments, the storage device 506 is non-volatile, solid-state memory. In other embodiments, the storage device 506 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 508 allows a user to provide input to, receive output from, and otherwise transfer data to and receive data from linear delta operating system 500. The I/O interface 508 may include a mouse, a keypad or a keyboard, a touch screen, a camera, an optical scanner, network interface, modem, other known I/O devices or a combination of such 110 interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the linear delta operating system 500 and one or more other computing devices or networks. As an example and not by way of limitation, the communication interface 510 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 510 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 510 may facilitate communications with a wireless PAN ("WPAN") (such as, for example, a BLUETOOTH WPAN"), a WI-FI network, a WI-MAX network, a cellular telephone network (such as, for example, a Global System for Mobile Communications ("GSM") network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the linear delta operating system 500 to each other. As an example and not by way of limitation, the communication infrastructure 512 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and legal equivalents.

What is claimed is:

1. A dual linear delta assembly, comprising:
   a frame;
   a first linear delta system, comprising:
     first rails mounted to the frame;
     first linear actuators, each first linear actuator coupled to a first respective rail of the first rails and configured to translate along a longitudinal length of the first respective rail;
     first pairs of parallel rods each operably coupled to a first respective linear actuator of the first linear actuators; and
     a first platform coupled to a longitudinal end of each of the first pairs of parallel rods opposite the respective linear actuator of the first linear actuators; and
   a second linear delta system, comprising:
     second rails mounted to the frame, wherein each rail of the second rails is disposed between adjacent rails of the first rails;
     second linear actuators, each second linear actuator coupled to a second respective rail of the second rails and configured to translate along a longitudinal length of the second respective rail;
     second pairs of parallel rods each operably coupled to a second respective linear actuator of the second linear actuators; and
     a second platform coupled to a longitudinal end of each of the second pairs of parallel rods opposite the respective linear actuator of the second linear actuators.

2. The dual linear delta assembly of claim 1, wherein a first working surface of the first platform faces a first direction, and wherein a second working surface of the second platform faces a second direction at least substantially opposite to the first direction.

3. The dual linear delta assembly of claim 1, wherein rails of the second rails are angularly separated from rails of the first rails by about 60° about a center longitudinal axis of the dual linear delta assembly.

4. The dual linear delta assembly of claim 1, wherein the second platform and the second pairs of parallel rods are disposed axially above the first platform and first pairs of parallel rods along a center longitudinal axis of the dual linear delta assembly.

5. The dual linear delta assembly of claim 1, further comprising an object coupled to at least one of the first platform or the second platform.

6. The dual linear delta assembly of claim 5, wherein the object is coupled to both the first platform and the second platform.

7. The dual linear delta assembly of claim 1, further comprising:
    first drive units operably coupled to the first linear actuators; and
    second drive units operably coupled to the second linear actuators.

8. The dual linear delta assembly of claim 7, further comprising a controller operably coupled to the first drive units and the second drive units.

9. The dual linear delta assembly of claim 1, wherein a combination of the first linear delta system and the second linear delta system exhibits a relative workspace between the first linear delta system and the second linear delta system that is at least four times greater in volume than a workspace exhibited by only the first linear delta system.

10. A dual linear delta assembly, comprising:
    a frame;
    a first linear delta system mounted to the frame; and
    a second linear delta system mounted to the frame and concentric to the first linear delta system.

11. The dual linear delta assembly of claim 10, wherein the first linear delta system comprises:
    first rails mounted to the frame;
    first linear actuators, each first linear actuator coupled to a first respective rail of the first rails and configured to translate along a longitudinal length of the first respective rail;
    first pairs of parallel rods each operably coupled to a first respective linear actuator of the first linear actuators; and
    a first platform coupled to a longitudinal end of each of the first pairs of parallel rods opposite the first respective linear actuator of the first linear actuators.

12. The dual linear delta assembly of claim 11, wherein the second linear delta system comprises:
    second rails mounted to the frame, wherein each rail of the second rails is disposed between adjacent rails of the first rails;
    second linear actuators, each second linear actuator coupled to a second respective rail of the second rails and configured to translate along a longitudinal length of the second respective rail;
    second pairs of parallel rods each operably coupled to a second respective linear actuator of the second linear actuators; and
    a second platform coupled to a longitudinal end of each of the second pairs of parallel rods opposite the second respective linear actuator of the second linear actuators.

13. The dual linear delta assembly of claim 12, wherein the second platform and the second pairs of parallel rods are disposed axially above the first platform and first pairs of parallel rods along a center longitudinal axis of the dual linear delta assembly.

14. The dual linear delta assembly of claim 12, further comprising an object coupled to at least one of the first platform or the second platform.

15. The dual linear delta assembly of claim 14, wherein the object is coupled to both the first platform and the second platform.

16. The dual linear delta assembly of claim 10, wherein a combination of the first linear delta system and the second linear delta system exhibits a relative workspace between the first linear delta system and the second linear delta system that is at least four times greater in volume than a workspace exhibited by only the first linear delta system.

17. A method of forming a dual linear delta assembly, the method comprising:
    mounting first rails to a frame;
    mounting second rails to the frame such that each rail of the second rails is disposed between adjacent rails of the first rails;
    coupling first linear actuators to the first rails;
    coupling second linear actuators to the second rails;
    coupling first pairs of parallel rods to each linear actuator of the first linear actuators;
    coupling second pairs of parallel rods to each linear actuator of the second linear actuators;
    coupling a first platform to the first pairs of parallel rods; and
    coupling a second platform to the second pairs of parallel rods.

18. The method of claim 17, further comprising coupling an object to both of the first platform and the second platform.

19. The method of claim 17, wherein coupling the second linear actuators to the second rails comprises mounting the second linear actuators at an axial location above an axial location of the first linear actuators along a center longitudinal axis of the dual linear delta assembly.

20. The method of claim 17, further comprising:
    coupling first drive units to the first linear actuators;
    coupling second drive units to the second linear actuators; and
    coupling a controller to the first drive units and the second drive units.

21. A method of operating a dual linear delta assembly, the method comprising:
    coupling an object to a first platform of a first linear delta system coupled to a common frame of a dual linear delta assembly;
    coupling the object to a second platform of a second linear delta system coupled to the common frame of the dual linear delta assembly;
    manipulating the object with the first platform by translating at least one first linear actuator along a first rail; and
    manipulating the object with the second platform by translating at least one second linear actuator along a second rail.

22. The method of claim 21,
    wherein manipulating the object with the first platform comprises moving a first longitudinal end of the object in a first direction with the first platform, and
    wherein manipulating the object with the second platform comprises moving a second longitudinal end of the object in a second direction opposite to the first direction with the second platform.

23. The method of claim 21,
wherein manipulating the object with the first platform includes operating the object with the first platform, and
wherein manipulating the object with the second platform includes moving the object in a direction with the second platform.

\* \* \* \* \*

UNITED STATES PATENT AND TRADEMARK OFFICE
CERTIFICATE OF CORRECTION

PATENT NO. : 10,821,599 B2
APPLICATION NO. : 16/191093
DATED : November 3, 2020
INVENTOR(S) : Anthony L. Crawford It is certified that error appears in the above-identified patent and that said Letters Patent is hereby corrected as shown below:

In the Specification
    Column 1,    Line 9,     change "DE-AC07-05-1D14517 awarded" to --DE-AC07-05-ID14517 awarded--
    Column 5,    Line 43,    change "depicted in. FIG. 2." to --depicted in FIG. 2.--
    Column 13,   Line 15,    change "such 110 interfaces." to --such I/O interfaces.--

Signed and Sealed this
Twenty-ninth Day of December, 2020

Andrei Iancu
*Director of the United States Patent and Trademark Office*